(12) United States Patent
Russell et al.

(10) Patent No.: US 8,387,749 B2
(45) Date of Patent: Mar. 5, 2013

(54) SHOCK ABSORBING FABRIC STRUCTURES

(75) Inventors: Timothy M. Russell, Anniston, AL (US); John E. Jennings, Anniston, AL (US)

(73) Assignee: YKK Corporation of America, Marietta, GA (US)

( * ) Notice: Subject to any disclaimer, the term of this patent is extended or adjusted under 35 U.S.C. 154(b) by 1012 days.

(21) Appl. No.: 12/183,491

(22) Filed: Jul. 31, 2008

(65) Prior Publication Data

US 2009/0023352 A1  Jan. 22, 2009

Related U.S. Application Data

(63) Continuation-in-part of application No. 12/103,565, filed on Apr. 15, 2008, now Pat. No. 7,677,360, which is a continuation of application No. 10/790,394, filed on Mar. 1, 2004, now abandoned.

(51) Int. Cl.
*A62B 35/00* (2006.01)

(52) U.S. Cl. .......................................................... 182/3

(58) Field of Classification Search ................. 182/3, 18
See application file for complete search history.

(56) References Cited

U.S. PATENT DOCUMENTS

| | | | | |
|---|---|---|---|---|
| 2,681,667 A | * | 6/1954 | Slaughter | 139/387 R |
| 3,444,957 A | | 5/1969 | Ervin, Jr. | |
| 3,550,956 A | | 12/1970 | Lowe | |
| 3,550,957 A | | 12/1970 | Radke et al. | |
| 3,804,698 A | | 4/1974 | Kinloch | |
| 3,861,744 A | | 1/1975 | Yamada et al. | |
| 3,872,895 A | * | 3/1975 | Takada | 139/383 R |
| 3,978,894 A | | 9/1976 | Boone | |
| 3,997,190 A | | 12/1976 | Seiffert et al. | |
| 4,004,616 A | | 1/1977 | Andronov et al. | |
| 4,138,157 A | | 2/1979 | Pickett et al. | |
| 4,209,044 A | | 6/1980 | Taki | |
| 4,253,544 A | * | 3/1981 | Dalmaso | 182/3 |
| 4,515,254 A | | 5/1985 | Markov et al. | |
| 4,538,702 A | | 9/1985 | Wolner | |
| 4,571,765 A | | 2/1986 | Okada et al. | |
| 4,604,315 A | | 8/1986 | McCall et al. | |

(Continued)

FOREIGN PATENT DOCUMENTS

| | | |
|---|---|---|
| EP | 0034458 | 8/1981 |
| EP | 0128662 A2 | 12/1984 |

(Continued)

OTHER PUBLICATIONS

PCT/US2005/029140, Written Opinion of the International Searching Authority, Jan. 13, 2006.

(Continued)

*Primary Examiner* — Alvin Chin Shue
(74) *Attorney, Agent, or Firm* — Kilpatrick Townsend & Stockton LLP

(57) ABSTRACT

Fabric structures having two connection segments and an expansion segment between the two connection segments are provided. The fabric structure includes ground yarns that form a sheath, binder yarns, elongation yarns surrounded by the sheath, and lateral yarns. In the expansion segment, at least some of the lateral yarns are interwoven with the elongation yarns to connect the elongation yarns laterally with the sheath. Heat treatment of the expansion segment shrinks the length of the elongation yarns during manufacture. The sheath does not substantially shrink from the heat treatment relative to the elongation yarns and gathers together in an accordion-like arrangement. A tensile load applied to the fabric structure stretches the elongation yarns and unfolds the gathered sheath. The high strength sheath supports the tensile load when completely unfolded, while the elongation yarns absorbs energy as the fabric structure stretches or elongates.

25 Claims, 16 Drawing Sheets

U.S. PATENT DOCUMENTS

| | | | |
|---|---|---|---|
| 4,618,026 A | 10/1986 | Olson | |
| 4,662,487 A | 5/1987 | Koch | |
| 4,745,883 A | 5/1988 | Baggetta | |
| 4,746,769 A | 5/1988 | Piper | |
| 4,853,175 A | 8/1989 | Book, Sr. | |
| 4,853,275 A | 8/1989 | Tracy et al. | |
| 4,897,902 A | 2/1990 | Kavesh et al. | |
| 5,027,477 A | 7/1991 | Seron | |
| 5,113,891 A | 5/1992 | Carney | |
| 5,113,981 A | 5/1992 | Lantz et al. | |
| 5,143,187 A | 9/1992 | McQuarrie et al. | |
| 5,174,410 A | 12/1992 | Casebolt | |
| 5,202,177 A | 4/1993 | Kamper | |
| 5,287,943 A | 2/1994 | Bell | |
| 5,433,290 A | 7/1995 | Ellis et al. | |
| 5,464,252 A | 11/1995 | Kanazawa et al. | |
| 5,478,636 A | 12/1995 | Koseki | |
| 5,529,343 A | 6/1996 | Klink | |
| 5,564,476 A | 10/1996 | Golz | |
| 5,598,900 A | 2/1997 | O'Rourke | |
| 5,658,012 A | 8/1997 | Villarreal et al. | |
| 5,799,760 A | 9/1998 | Small | |
| 6,006,860 A * | 12/1999 | Bell | 182/18 |
| 6,085,802 A * | 7/2000 | Silberberg | 139/387 R |
| 6,283,167 B1 | 9/2001 | Chang et al. | |
| 6,299,040 B1 | 10/2001 | Matias | |
| 6,347,466 B1 | 2/2002 | Lackner et al. | |
| 6,390,234 B1 * | 5/2002 | Boyer | 182/3 |
| 6,533,066 B1 * | 3/2003 | O'Dell | 182/3 |
| 6,648,101 B2 | 11/2003 | Kurtgis | |
| 6,739,427 B2 | 5/2004 | Gayetty | |
| 6,776,317 B1 | 8/2004 | Parker | |
| 7,413,802 B2 | 8/2008 | Karayianni et al. | |
| 7,665,288 B2 | 2/2010 | Karayianni et al. | |
| 7,665,575 B2 | 2/2010 | Tanaka et al. | |
| 7,677,360 B2 | 3/2010 | Tanaka et al. | |
| 7,726,350 B2 | 6/2010 | Jennings et al. | |
| 2002/0180199 A1 | 12/2002 | Schneider et al. | |
| 2003/0069557 A1 | 4/2003 | Driskell et al. | |
| 2003/0173150 A1 | 9/2003 | Sharp | |
| 2004/0173276 A1 | 9/2004 | Horikawa | |
| 2005/0056335 A1 | 3/2005 | Tielemans et al. | |
| 2005/0189169 A1 | 9/2005 | Tanaka et al. | |
| 2006/0027277 A1 | 2/2006 | Jennings et al. | |
| 2007/0210639 A1 | 9/2007 | Berger et al. | |
| 2008/0190691 A1 | 8/2008 | Tanaka et al. | |
| 2009/0114307 A1 | 5/2009 | Jennings et al. | |

FOREIGN PATENT DOCUMENTS

| | | |
|---|---|---|
| EP | 0496028 | 7/1992 |
| EP | 0665142 B1 | 11/1996 |
| EP | 0851779 B1 | 8/2000 |
| EP | 1069008 | 1/2001 |
| EP | 0923403 B1 | 4/2003 |
| JP | S50-88684 | 12/1973 |
| JP | S59-500450 | 3/1984 |
| JP | S64-53777 | 4/1989 |
| JP | H03-185150 | 8/1991 |
| JP | 05-084317 | 4/1993 |
| JP | 05-141102 | 6/1993 |
| JP | 06-081244 | 3/1994 |
| JP | U1-9466714 | 9/1994 |
| JP | 07-246909 | 9/1995 |
| JP | 08-182770 | 7/1996 |
| WO | WO-93/12838 | 7/1993 |
| WO | WO-97/10876 | 3/1997 |
| WO | WO-98/41284 | 9/1998 |
| WO | WO-01/26738 | 4/2001 |
| WO | WO-2007011336 | 1/2007 |
| WO | WO-2007/021278 | 2/2007 |

OTHER PUBLICATIONS

PCT/US05/25043 International Search Report and Written Opinion mailed Nov. 1, 2005.

PCT/US2005/029140 International Search Report dated Jan. 13, 2006.

PCT/US2009/033431 International Search Report and Written Opinion dated May 8, 2009.

Japanese Patent Application No. 2011-500826, Office Action mailed Jun. 19, 2012 (4 pages).

* cited by examiner

SHOCK ABSORBING FABRIC STRUCTURES

CROSS REFERENCE TO RELATED APPLICATIONS

This application is a continuation-in-part of U.S. application Ser. No. 12/103,565 titled "Shock Absorbing Lanyards" filed Apr. 15, 2008, which is a continuation of U.S. application Ser. No. 10/790,394 titled "Shock Absorbing Lanyards" filed Mar. 1, 2004, both of which are incorporated herein by reference.

BACKGROUND OF THE INVENTION

People who are at elevated positions above a floor or other relatively lower surface can be at risk of falling and injury. For example, workers and other personnel who have occupations that require them to be at elevated positions, such as on scaffolding, can be at risk of falling and injury. Safety harnesses can be worn to stop a person's fall and prevent or reduce injury. Safety harnesses, such as a seat belt, also can be worn to secure the occupant of a vehicle in the event of a sudden stop or collision to reduce the risk of injury.

Safety harnesses typically have a harness portion worn by the user and a tether or lanyard extending from the harness portion. The lanyard connects the harness portion to a secure structure. If a person falls from the elevated position, or is subjected to inertia due to a vehicle's sudden stop, the safety harness stops the person's fall, or prevents the person's forward movement, when the lanyard is straightened. With typical lanyards, however, the person's movement is stopped rather abruptly and the person is subjected to the shock force of the abrupt stop.

Lanyards that attempt to absorb the shock of a person's fall are known. Current lanyards have been made from two separate webbings assembled together. One webbing is a narrow, flat webbing woven of partially oriented yarn (POY webbing) and the other webbing is a relatively higher strength tubular-shaped webbing. After manufacture of the two webbings, the POY webbing is inserted into one end of the tubular-shaped webbing and pulled through the tubular-shaped webbing. A hook or other device inserted into the opposite end of the tubular-shaped webbing can be used to pull the POY webbing through the tubular-shaped webbing. The POY webbing is pulled through the tubular-shaped webbing so that the POY webbing extends inside of the tubular-shaped webbing from one end to the opposite end. The relative lengths of the POY webbing and the tubular-shaped webbing then must be adjusted. While holding the POY webbing in place, one end of the tubular-shaped webbing is moved closer to the opposite end to place the tubular-shaped webbing in an accordion-like position over the POY webbing. The relative length adjustment of the webbings is performed manually and is a significant disadvantage of existing lanyards. After the manual adjustment of the relative webbing lengths, the POY webbing is essentially in a straight, linear orientation inside of the accordion-shaped orientation of the tubular-shaped webbing. The two webbings are then attached to each other by sewing at the ends. Any excess POY webbing extending out of the ends of the tubular-shaped webbing is cut off and discarded.

Because conventional lanyards are made from two separate webbings that must be assembled together, manufacture of the lanyards requires costly and tedious assembly processes, such as inserting the POY webbing through the tubular-shaped webbing. Also, after the insertion process, an additional manual process is required that adjusts the relative webbing lengths by placing the tubular-shaped webbing in the accordion position while maintaining the POY webbing in a straight position. Then, another process is required to attach the two separate webbings together while maintaining the POY webbing in the straight position and the tubular-shaped webbing in the accordion-shaped position. The relative lengths of the POY webbing and the tubular-shaped webbing is critical for proper functioning of the lanyard. The manufacturing process is complicated by proper control and manual setting of the critical relative lengths of the two webbings.

Existing lanyards that purport to reduce shock can be found in U.S. Pat. Nos. 5,113,981; 6,085,802; 6,390,234; and 6,533,066 and WIPO Publication No. WO/01/026738.

SUMMARY OF THE INVENTION

Certain embodiments of the invention generally pertain to fabric structures, such as lanyards and shock absorbing and load limiting lanyards, and methods of making them. More specifically, some embodiments of the invention pertain to shock absorbing and force limiter structures having a shock absorbing member and a load bearing member, wherein the shock absorbing member is substantially shorter than the load bearing member. The relative lengths of the shock absorbing member and the load bearing member is automatically adjusted. Also, the shock absorbing member and the load bearing member may be woven together in certain portions of the structures. Certain embodiments of the invention further pertain to methods of making fabric structures such as shock absorbing lanyards. Certain embodiments of the invention provide improved fabric structures that can elongate, absorb energy, and support a load.

According to one embodiment of the invention, the fabric structure is a woven one-piece webbing that includes a sheath made from a plurality of ground yarns and an elongation member surrounded by the sheath. In some embodiments, the sheath can be high strength sheath. The fabric structure can also include a plurality of binder yarns and a plurality of lateral yarns.

The elongation member can be made from elongation yarns, such as POY. In some embodiments, the webbing has a first connection segment, an expansion segment, and a second connection segment. In the first and second connection segments, the binder yarns can be interwoven with the ground yarns and the elongation yarns. In the expansion section, some of the lateral yarns can be interwoven with the elongation yarns to connect the elongation yarns with the sheath, and the binder yarns can be woven with the ground yarns of the sheath but not woven with the elongation yarns. Also in the expansion segment, the length of the elongation yarns can be shorter than the length of the sheath. Heat treatment can shrink the length of the elongation yarns in the expansion segment. In contrast, the yarns of the sheath do not substantially shrink from the heat treatment relative to the elongation member, and gather together in an accordion-like arrangement.

Upon application of a predetermined load, the fabric structure stretches the elongation member and unfolds the gathered sheath. The sheath supports the tensile load as it unfolds, while the elongation member absorbs energy as it stretches. In this way, the fabric structure can be used to stop a person's fall or other movement and reduce a shock force felt by the user when that movement is stopped. According to some embodiments, the fabric structure may also be attached to a hardware component, such as a clip, a harness, or a component of a seatbelt.

BRIEF DESCRIPTION OF THE FIGURES

FIGS. 4-8 are pick diagrams of various weaving patterns of the expansion segment according to various embodiments of the fabric structure.

FIGS. 13-17 are pick diagrams of various weaving patterns of the connection segment according to various embodiment of the fabric structure.

FIG. 18, comprising

DETAILED DESCRIPTION OF THE INVENTION

Figure 1:
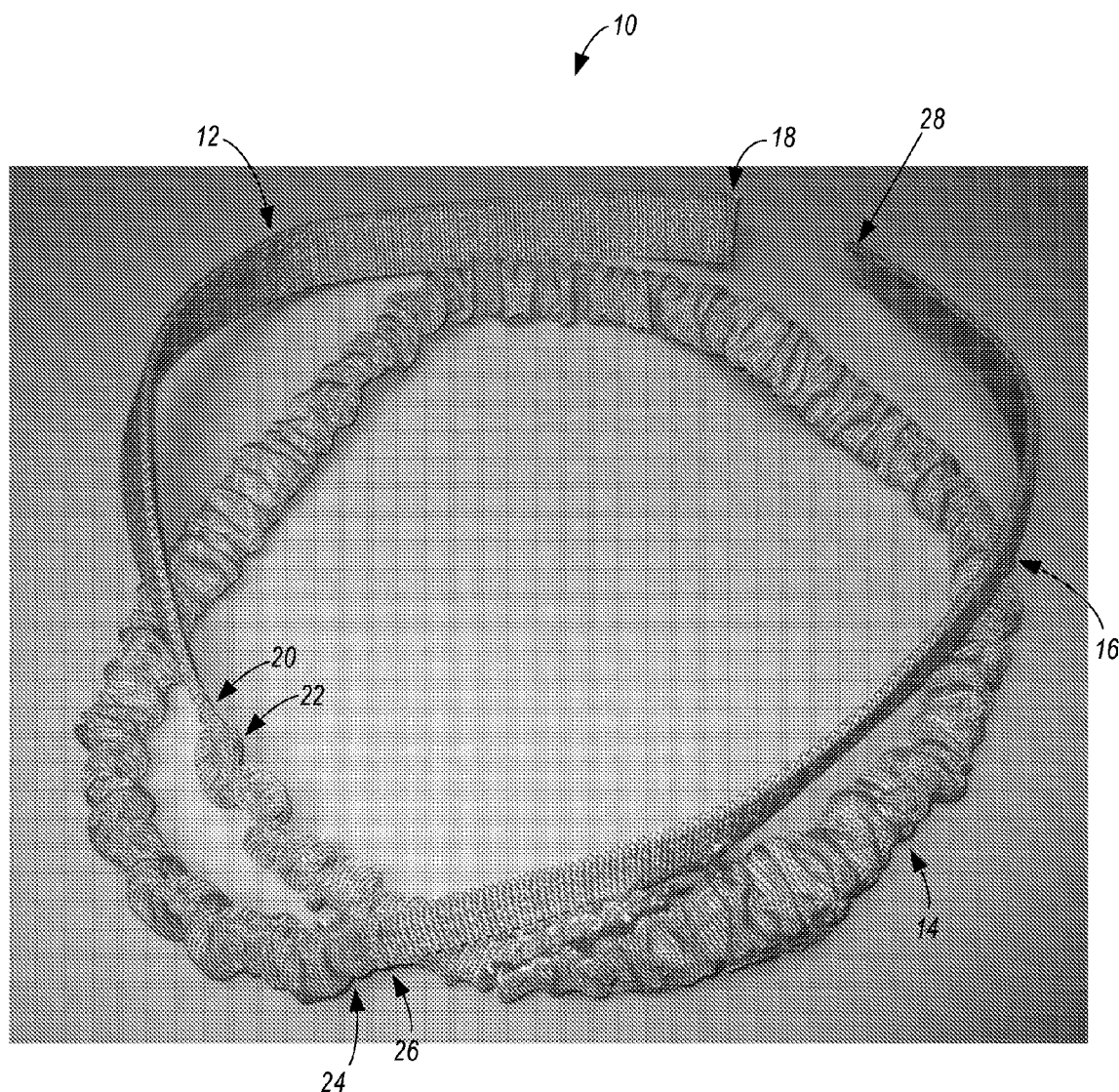
FIG. 1 is a photograph of a fabric structure according to one embodiment of the invention.

Certain embodiments of the invention provide fabric structures comprised of woven webbings 10. As shown in FIG. 1, the woven webbing 10 according to one embodiment comprises a first connection segment 12, an expansion segment 14, and a second connection segment 16. The first connection segment 12 includes a first end 18 and a second end 20. The expansion segment 14 includes a first end 22 and a second end 24. The second connection segment includes a first end 26 and a second end 28. In the embodiment of FIG. 1, the first end 22 of the expansion segment 14 is adjacent to the second end 20 of the first connection segment 12, and the first end 26 of the second connection segment 16 is adjacent to the second end 24 of the expansion section 14.

Figure 2:
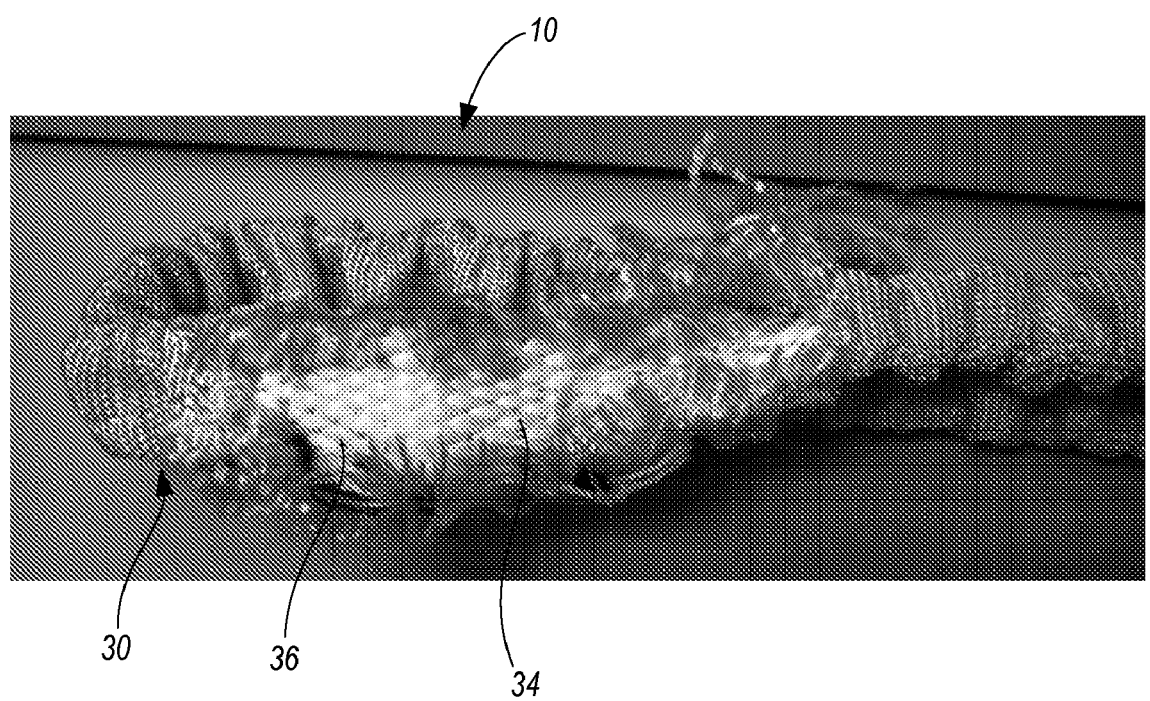
FIG. 2 is a photograph of a partial cut-away of the fabric structure of FIG. 1.

As shown in the embodiment of FIG. 2, the woven webbing 10 includes a plurality of elongation yarn bundles 34, each bundle comprising a plurality of elongation yarns 33, and a sheath 30, which is formed from a plurality of ground yarns 31 and 32. In the preferred embodiment, the ground yarns are polyester and each have a linear density of approximately 2,600 denier. However, the ground yarns 31 and 32 could be made from other suitable materials that are relatively higher strength and that do not shrink or shrink substantially less than the elongation yarns during heat treatment. For example, in some embodiments, the ground yarns 31 and 32 forming the sheath 30 have a strength of at least 5,000 pounds tensile strength. In other embodiments, the ground yarns have a nominal breaking strength of greater than 5,400 pounds and, in some embodiments, have a nominal breaking strength exceeding 6,000 pounds, in compliance with 29 C.F.R. 1926.104(d) (2008), American National Standards Institute ("ANSI") Z335.1, Canadian standard Z259.1.1 Class 1A and 1B, European standard BS EN 355:2002, and Australian standard AN/NZS 1891.1.1995.

The elongation yarn bundles 34 are surrounded by the sheath 30. The elongation yarns 33 are highly extensible and significantly stretch when placed under a tensile load. The elongation yarns can have any desired configuration, such as woven together or non-woven, for example. In some embodiments, as shown in FIG. 2, the elongation yarns 33 can be grouped into elongation yarn bundles 34. For example, in a preferred embodiment, the woven webbing 10 includes approximately seventy-five elongation yarns 33 grouped into approximately twelve bundles 34. The elongation yarns 33 are one example of shock absorbing members of the woven webbing 10. In the preferred embodiment, the elongation yarns 33 are partially oriented yarns (POY) made of polymer materials such as polyester, but the elongation yarns 33 can be made from one or more suitable materials having high elongation properties and the ability to shrink in length, such as during heat treatment. In some embodiments, each of the elongation yarns has a linear density of between approximately 300 denier and approximately 5,800 denier. Together, each bundle of elongation yarns has a linear density of approximately 34,000 denier.

In some embodiments, the sheath 30 is preferably woven with the elongation yarn bundles 34 extending in a substantially warp direction through the inside of the sheath 30. The sheath 30 supports a load applied to the woven webbing 10 after the elongation yarns 33 elongate under the load. The fabric structure is formed with the simultaneous weaving of the elongation yarns 33 with the ground yarns 31 and 32 of the sheath 30. Thus, the woven webbing 10 is woven as a one-piece webbing. The elongation yarns 33 and the sheath 30 can each be made from materials having any desired structure, for example, woven materials, braided materials, knitted materials, non-woven materials, and combinations thereof.

FIG. 2 shows a cut-away view of the fabric structure of FIG. 1 in a finished form in which, in the expansion segment, the sheath 30 is in an accordion-like configuration that surrounds the elongation yarn bundles 34. The elongation yarn bundles 34 inside of the sheath 30 have a generally linear configuration rather than the accordion-like configuration of the sheath 30. The accordion-like configuration of the sheath 30 in the expansion segment 14 is automatically formed by a heat treating process preferably after the woven webbing comes off of the loom.

In some embodiments, as explained further below, the elongation yarns 33 and the ground yarns 31 and 32 of the sheath 30 are connected and secured together at the first connection segment 12 and the second connection segment 16. For example, the elongation yarns 33 and the ground yarns 31 and 32 can be integrally woven or interlaced together with binder yarns 38 and 39. In some embodiments, the binder yarns 39 and 39 are lighter, smaller denier yarns than the ground yarns. For example, in some embodiments, the binder yarns can be between approximately 300-1500 denier polyester yarns. In other embodiments, the binder yarns can be industrial filament polyester, nylon, Nomex, Kevlar, or any other suitable yarn. The interlaced weaving of the elongation yarns 33 and the ground yarns 31 and 32 of the sheath 30 secures the two types of yarns together during weaving of the woven webbing 10. Preferably, the elongation yarns 33 are secured to the sheath 30 such that the elongation yarns 33 and the sheath 30 cannot be readily separated at the first connection segment 12 and the second connection segment 16 during use. The elongation yarns 33 also can be secured to the sheath 30 by stitching the elongation yarns 33 and the ground yarns 31 and 32 together.

As stated above, the elongation yarns 33 are made of one or more materials that shrink in length during heat treatment, and the ground yarns 31 and 32 of the sheath 30 are made of one or more materials that do not shrink in length or shrink substantially less than the elongation yarns 33. Because the elongation yarns 33 and the sheath 30 are connected together at the first connection segment 12 and the second connection segment 14, the length of the elongation yarns 33 reduces significantly relative to the length of the ground yarns 31 and 32 of the sheath 30. In this way, the shrinking of the elongation yarns 33 draws the first connection segment 12 closer to the second connection segment 16. The length of the ground yarns 31 and 32 of the sheath 30 is not significantly reduced relative to the length of the elongation yarns 33. Because the length of the sheath 30 is forced to occupy a shorter distance due to the reduced-length elongation yarns 33, the sheath 30 gathers together or bunches up in the expansion segment 14. In this manner, the sheath 30 automatically forms an accordion-like configuration in the expansion segment 14 after heat treatment of the woven webbing 10.

Important properties of the elongation yarns 33, which can serve as the shock absorbing member, can include some or all of high elongation, high shrinkage, and high shrink-force (the force produced during the shrinkage) to "accordion" the sheath. The elongation yarns 33 should have sufficiently high elongation and load bearing properties under load to absorb the load energy so as to reduce shock to a person or other body whose body is in a sudden deceleration state such as in a fall from a building, a parachute descending, or an automobile or aircraft accident. The shrinkage should be sufficiently high to achieve the correct relative lengths between the elongation yarns 33 and the sheath 30.

The relative lengths of the elongation yarns 33 and the sheath 30 in the finished woven webbing 10 provide for proper elongation of the formed woven webbing 10 (stretching of the elongation yarns 33 and unfolding of the sheath 30) to stop a person's fall or forward movement and reduce the shock force otherwise felt by the person. The relative lengths of the elongation yarns 33 and the sheath 30 can be conveniently and accurately controlled because the elongation yarns 33 and the sheath 30 are woven together as a one-piece woven webbing. Also, the heat treating process provides convenient and accurate control of the relative lengths by shrinking the elongation yarns 33 relative to the sheath 30, preferably after the elongation yarns 33 and the sheath 30 are secured together. In this manner, the relative lengths of the elongation yarns 33 and the sheath 30 in the expansion segment 14 are automatically adjusted. The relative lengths do not have to be adjusted before assembly of the elongation yarns 33 to the sheath 30. This is in contrast to conventional lanyards, which had the relative lengths adjusted or set before assembly of the partially oriented yarns (POY) to the outer webbing.

Various heat treating processes can be used to shrink the elongation yarns 33. For example, a continuous oven can be used in an in-line, continuous heating process. The webbing can be continuously woven and fed into the continuous oven for heat treatment. After exiting the continuous oven, the continuous webbing can be cut to a desired length to provide an individual fabric structure or lanyard. Another example of heat treatment is a batch process in which individual fabric structures are heat treated.

The elongation yarns 33 have an elongation property that allows the elongation yarns 33 to stretch significantly under a predetermined tensile force. The elongation yarns 33 have this elongation property even after the heat treatment process. When the fabric structure is placed under tensile load, the elongation yarns 33 stretch under tension and absorb the force or energy applied to the fabric structure 10. Accordingly, the elongation yarns 33 are a shock absorbing member that provides a shock absorbing feature.

In some embodiments, the sheath 30 provides a top sheath layer 40 and a bottom sheath layer 42 with the elongation yarn bundles 34 being positioned between the top 40 and bottom 42 sheath layers. In this way, the sheath 30 surrounds the elongation yarn bundles 34. The sheath 30 has other configurations in alternate embodiments.

Figure 3:
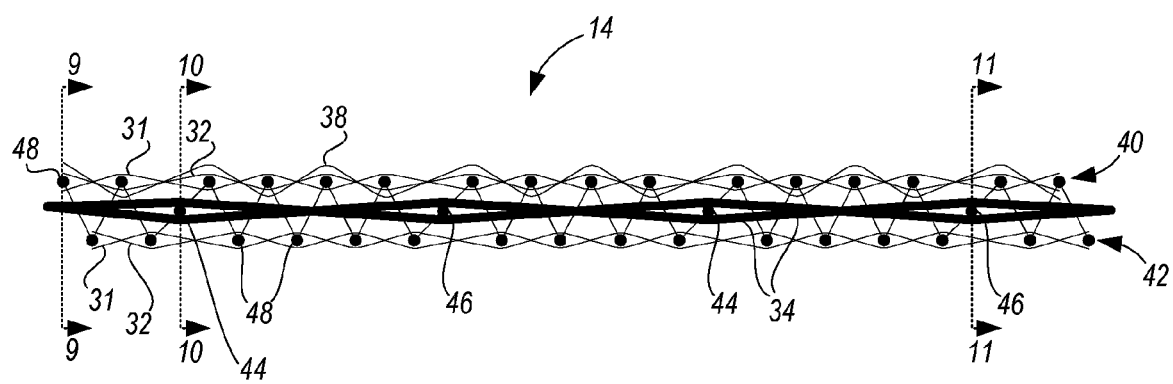
FIG. 3 is a cross-sectional view of a weaving pattern of the expansion segment of the fabric structure of FIG. 1.

Fabric structures of the present invention may be formed on any desired programmable loom, such as a needle loom. As described above, the fabric structure 10 has a first connection segment 12, an expansion segment 14, and a second connection segment 16. The expansion section expands during use. FIG. 3 shows a weaving pattern of the fabric structure 10 according to one embodiment of the invention. The fabric structure 10 is formed of a plurality of elongation yarns 33 (which can be grouped into elongation yarn bundles 34), a plurality of ground yarns 31 and 32, a plurality of binder yarns 38 and 39, and a plurality of lateral yarns 36. In some embodiments, the lateral yarns can be approximately 1,000 denier polyester yarns. In other embodiments, the lateral yarns can be industrial filament polyester, nylon, Nomex, Kevlar, or any other suitable yarn. The ground yarns 31 and 32 form the sheath 30. The binder yarns 38 and 39 and the ground yarns 31 and 32 extend in a substantially warp direction. Elongation yarn bundles 34, such as POY, also extend in a substantially warp direction, along the inside of the sheath 30 between the top layer 40 and the bottom layer 42.

In the expansion segment 14, the elongation yarn bundles are capable of shrinking freely during heat treatment. Also in the expansion segment 14, the elongation yarn bundles 34 are woven together with a plurality of lateral yarns 36 (also referred to as "weft" or "pick" yarns). In the embodiment shown in FIG. 3, the lateral yarns 36 are woven in a weft direction with the elongation yarn bundles 34 at a first attachment point 44 and a second attachment point 46. In the embodiment of FIG. 3, the first attachment point 44 corresponds to the fifth weft/pick and the second attachment point 46 corresponds to the fourteenth weft/pick. Thus, the weaving pattern of this embodiment repeats every fourteen wefts (fourteen weft repetitive pattern). In this embodiment, the two attachment points are separated by eight wefts. In other embodiments, the attachment points are separated by four or sixteen wefts.

Figure 4:
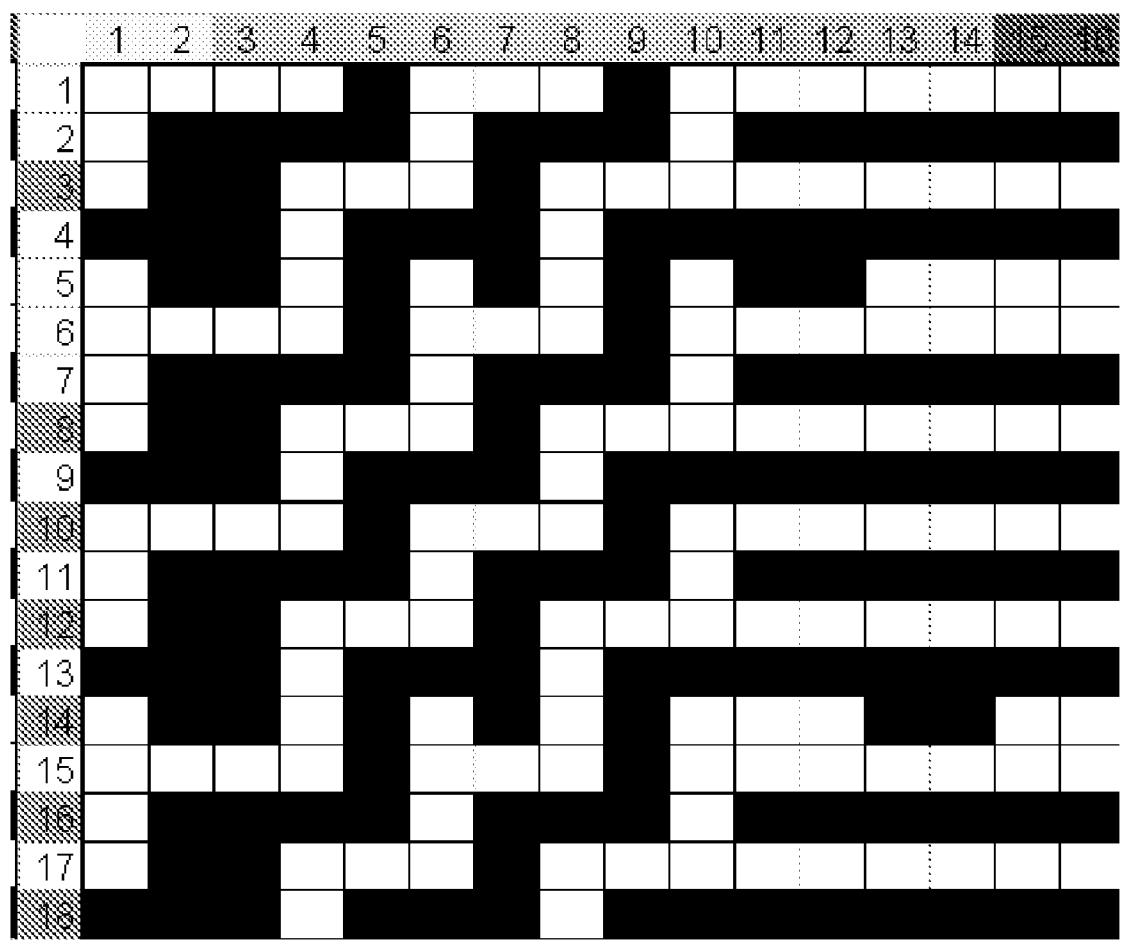
Figures 5, 6:
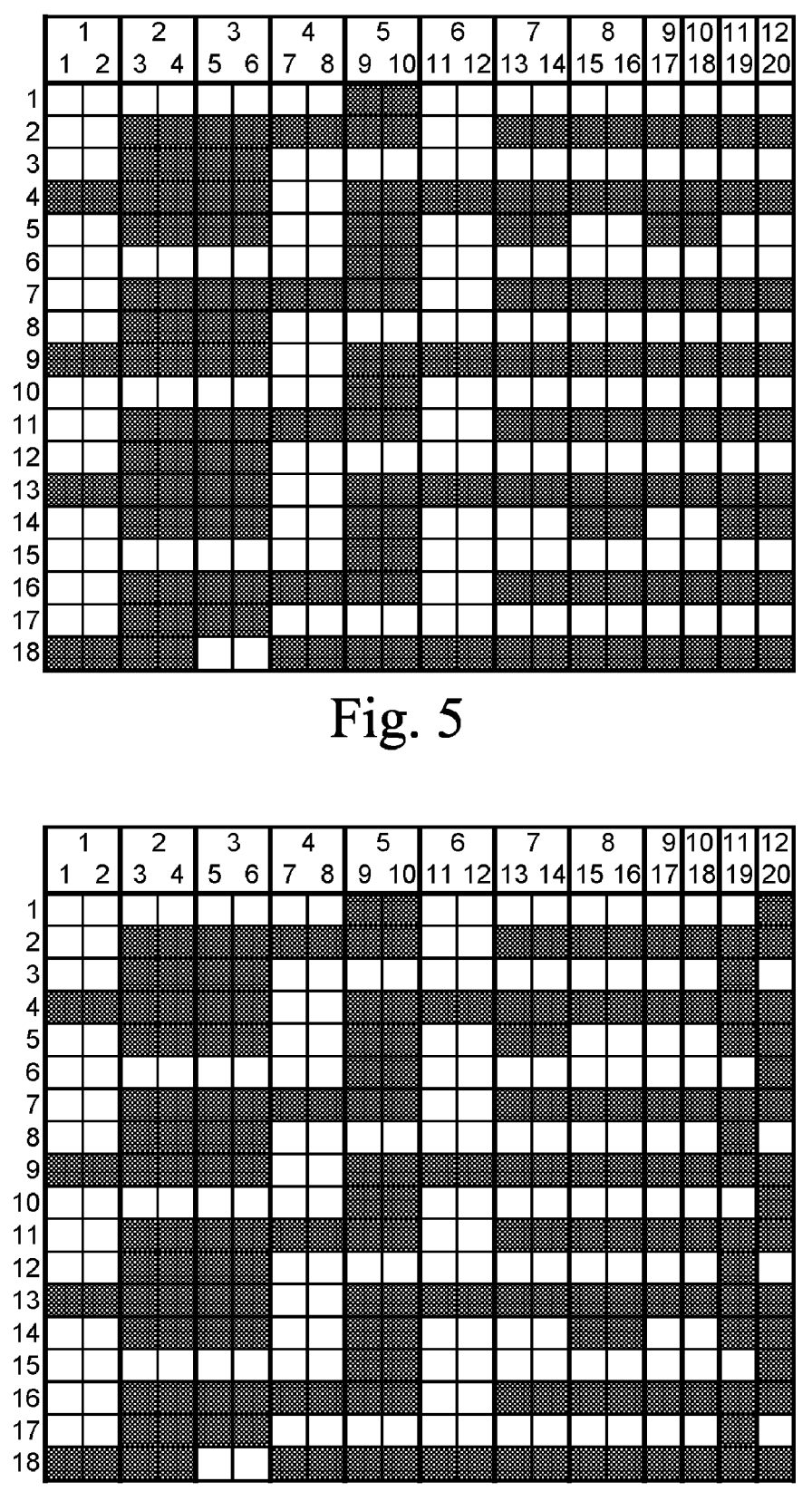
Figure 19:
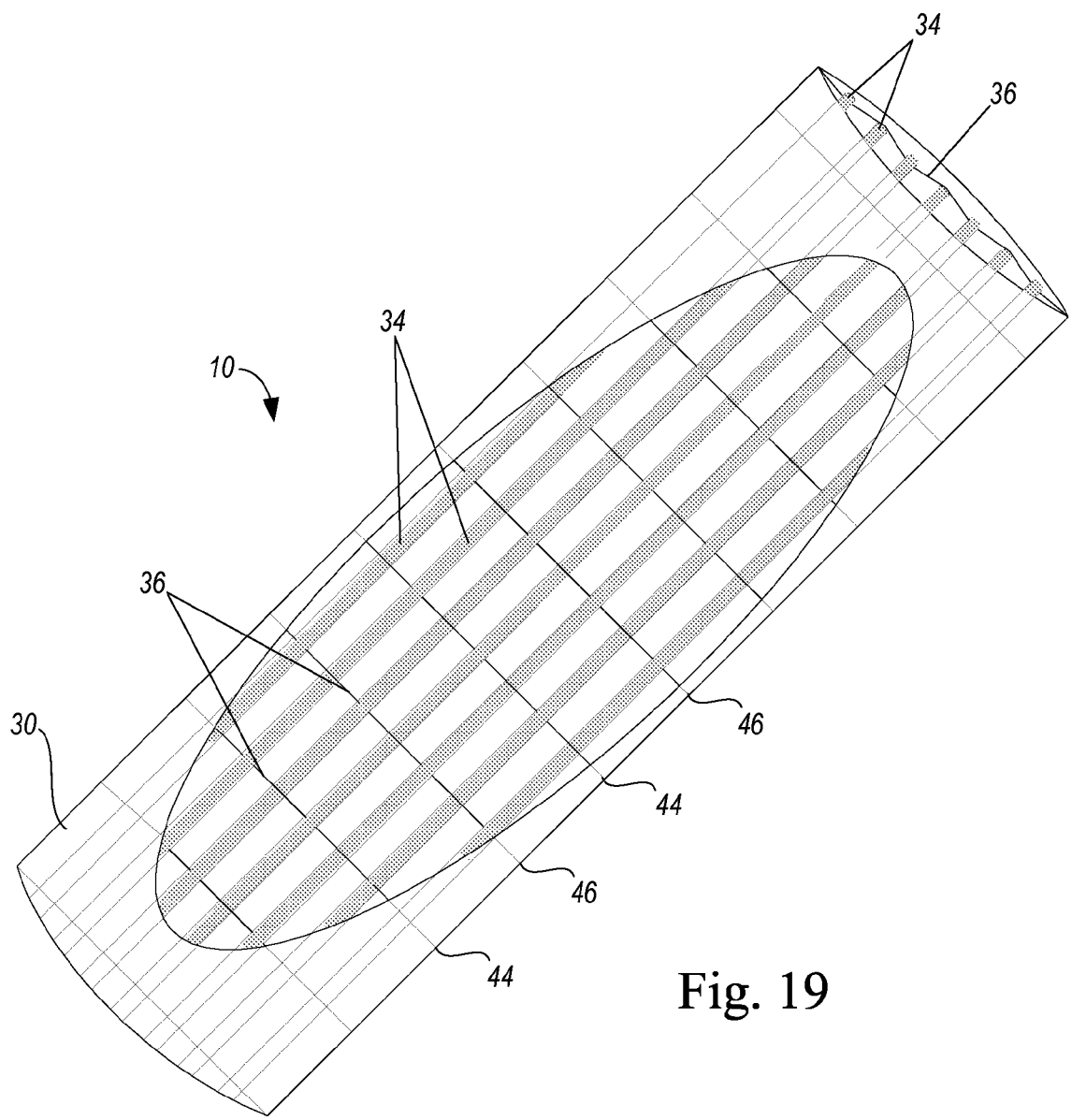
FIG. 19 is a side partial cut-away view of the expansion segment of the fabric structure of FIG. 3.

FIG. 19 shows a partial cut-away view of the expansion section 14 of the woven webbing 10 according to one embodiment. In this embodiment, seven elongation yarn bundles 34 are used. FIGS. 4-8 are pick diagrams (also known as chain diagrams or cam drafts) for the expansion segment 14. In all of these diagrams, the horizontal rows of squares represent lateral (also referred to as weft or pick) yarns, and the vertical columns (which correspond to harnesses of a loom) represent groups of warp yarns, such as the elongation yarn bundles, the ground yarns, or the binder yarns. The pick diagram of FIG. 4 shows a sixteen harness loom, with harnesses 1-2 representing the binder yarns 38 and 39, harnesses 3-10 representing the ground yarns 31 and 32, harnesses 11-14 representing the elongation yarn bundles, and harnesses 15-16 representing marker yarns 60.

Figure 9:
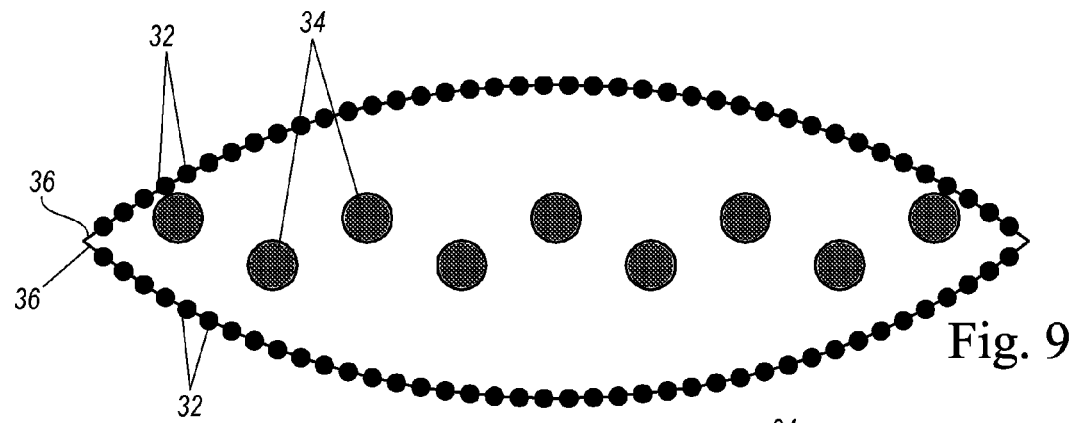
FIG. 9 is a cross-sectional view of the weaving pattern of the fabric structure of FIG. 3 at section 9-9 of that structure.

FIG. 9 shows a cross-sectional view taken along section 9-9 of FIG. 3. of the woven webbing 10, which comprises nine elongation yarn bundles in this embodiment, at a non-attachment point, such as non-attachment point 48 of FIG. 3. As shown in FIG. 9, at the non-attachment points, the lateral yarns 36 are woven with the ground yarns 31 and 32 and not woven with the elongation yarn bundles 34.

Figure 10:
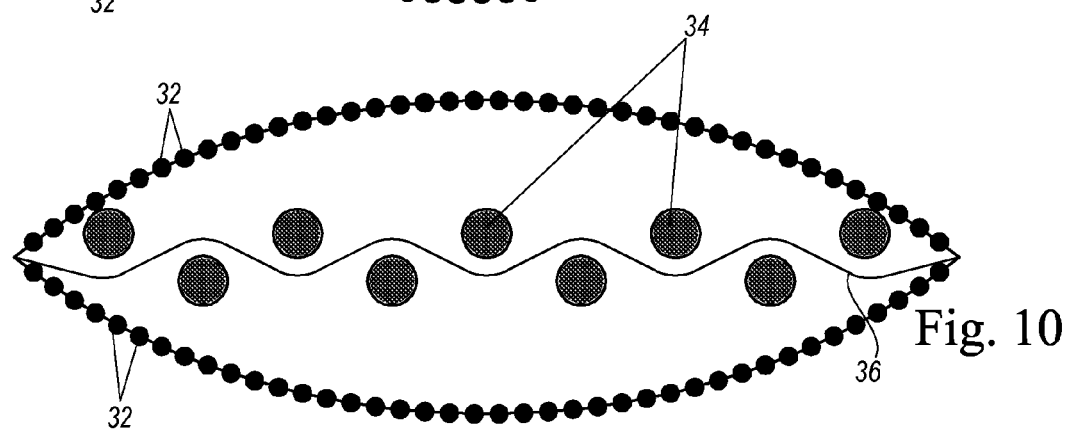
FIG. 10 is a cross-sectional view of the weaving pattern of the fabric structure of FIG. 3 at section 10-10 of that structure.
Figure 11:
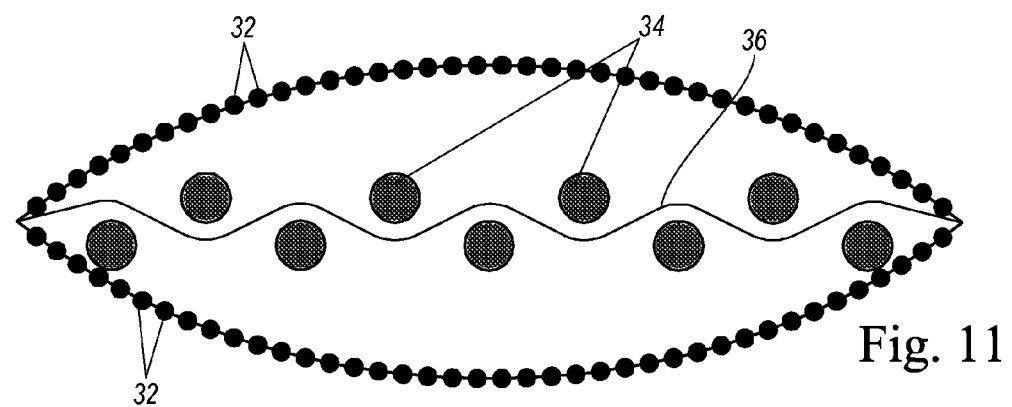
FIG. 11 is a cross-sectional view of the weaving pattern of the fabric structure of FIG. 3 at section 11-11 of that structure.

FIG. 10 shows a cross-sectional view taken along section 10-10 of FIG. 3 of the woven webbing 10 at the first attachment point 46 of FIG. 3. The loom lifts alternate elongation yarn bundles as a lateral yarn 36 is thrown. FIG. 11 shows a cross-sectional view taken along section 11-11 of FIG. 3 of the woven webbing 10 at the second attachment point 48 of FIG. 3, where a lateral yarn 36 is thrown as the elongation yarn bundles 34 that were lifted when the lateral yarn was thrown at the first attachment point 44 are now lowered, and the elongation yarn bundles 34 that were lowered when the lateral yarn was thrown at the first attachment point 44 are now lifted. In this way, the weaving pattern of the lateral yarns 36 and the elongation yarn bundles 34 at the first attachment point 44 is opposite of the weaving pattern of the lateral yarns 36 and the elongation yarn bundles 34 at the second attachment point 46. In this embodiment, the weaving pattern repeats after a cycle of fourteen picks. Although FIG. 3 shows a fourteen weft-yarn repetition, as few as approximately ten weft yarns, or fewer, could be used as the repetitive pattern, or as many as approximately thirty-four weft yarns or more could be used. Lateral yarns 36 could be woven with the elongation yarn bundles 34 at various other attachment points, however, and could be woven in a more or less frequent repetitive pattern than that shown in FIG. 3.

The expansion segment 14 of the woven webbing can have various other weaving patterns. FIGS. 5-8 are pick diagrams for creating an expansion segment 14 of the woven webbing with various weaving patterns. For example, FIGS. 5-8 show a twenty harness loom, with harnesses 1-2 representing binder yarns, harnesses 3-10 representing ground yarns, harnesses 11-14 representing elongation yarns, and harnesses 15-16 representing marker yarns.

In the expansion segment 14, the binder yarn 38 is interwoven with the ground yarns 31 and 32, but the binder yarn 38 is not woven with the elongation yarns 33.

Figure 12:
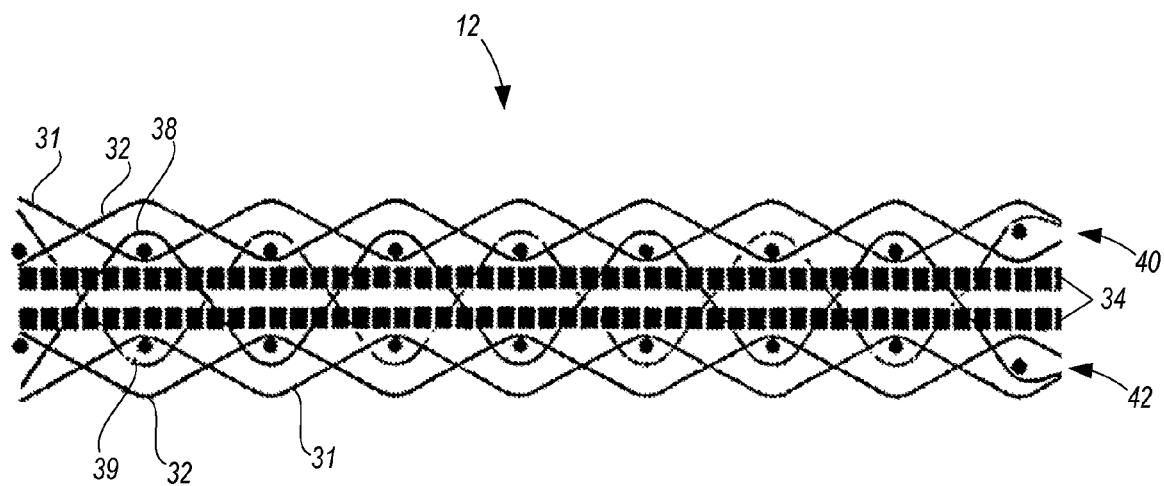
FIG. 12 is a cross-sectional view of a weaving pattern of a connection segment of the fabric structure of FIG. 1.

A weaving pattern of the first connection segment 12 according to one embodiment is illustrated in FIG. 12. In some embodiments, the second connection segment 16 has the same weaving pattern as the first connection segment 12. The first connection segment 12 comprises a plurality of ground yarns 31 and 32 woven to form a sheath 30 (the sheath having a top layer 40 and a bottom layer 42). Binder yarns 38 and 39 are woven or interlaced with both the ground yarns 31 and 32 and the elongation yarn bundles 34. In the first connection segment 12 and the second connection segment 16, the elongation yarn bundles 34 are connected and secured to the sheath 30. Accordingly, the binder yarns 38 and 39 secure the elongation yarn bundles 34 to the sheath 30 by stitching or otherwise interweaving the top and bottom layers of the sheath together. Other examples of weaving suitable for the connection segments provides the upper ground yarns interlacing with the lower ground yarns with or without the binder yarns.

Figure 13:
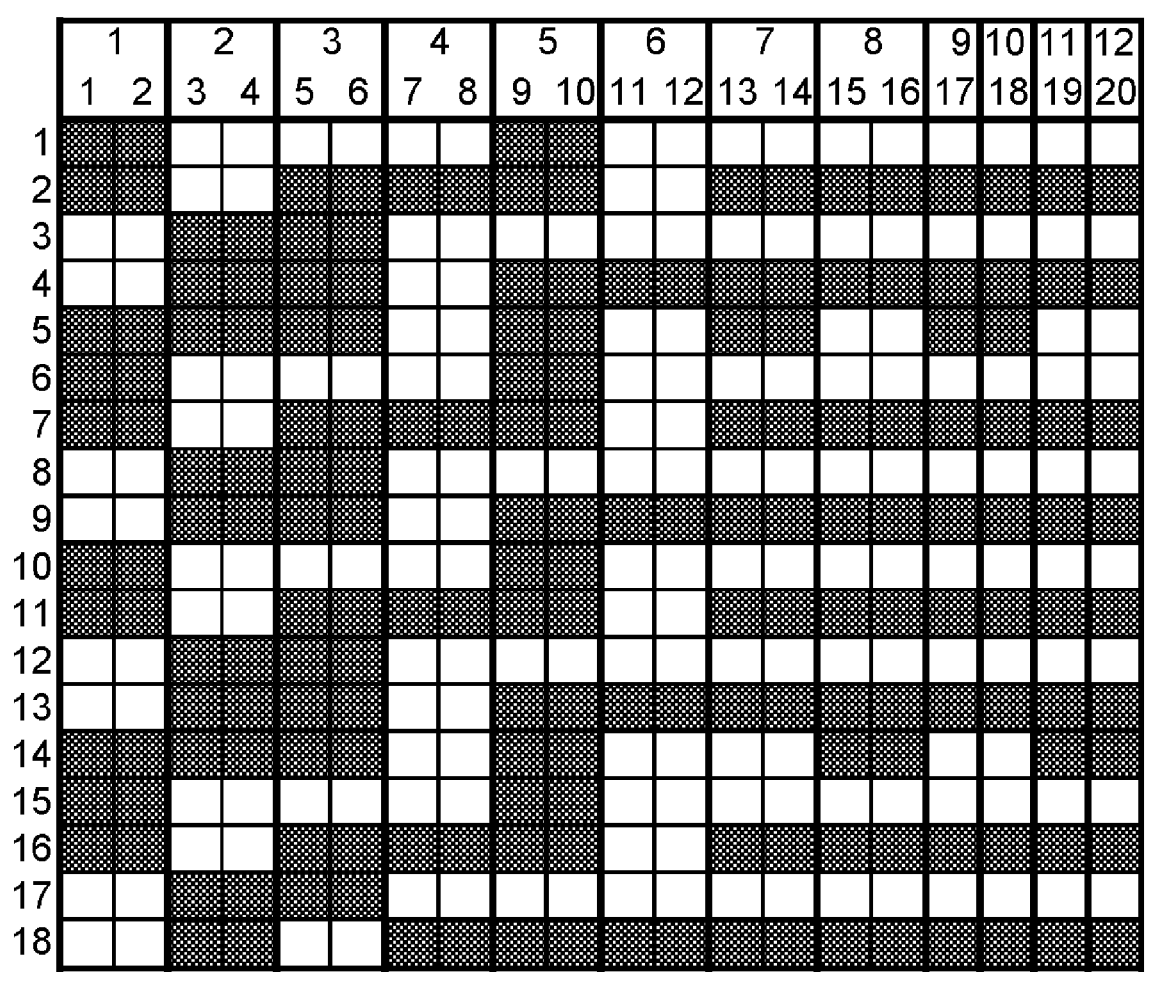
Figures 14, 15:
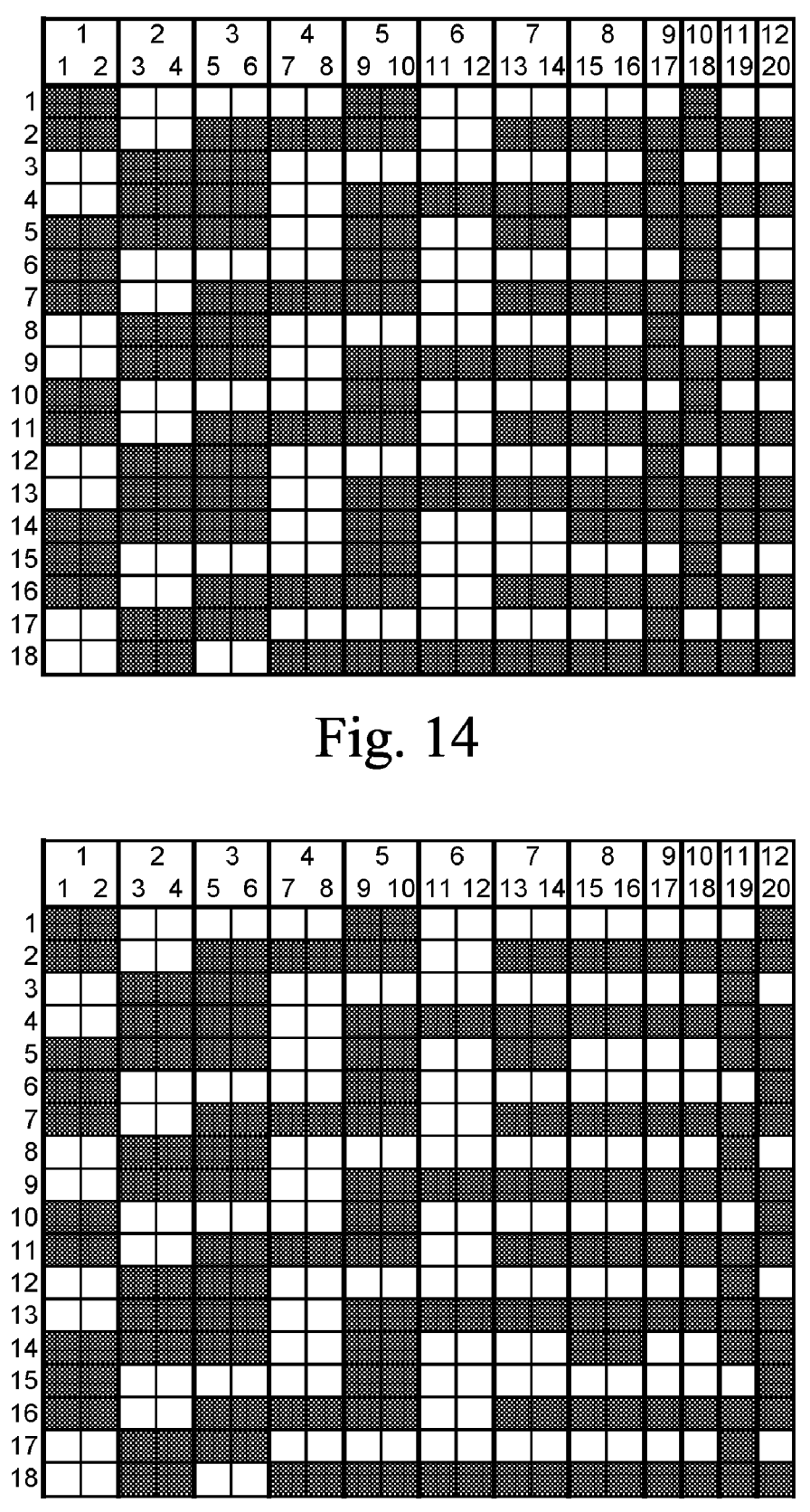
Figure 16:
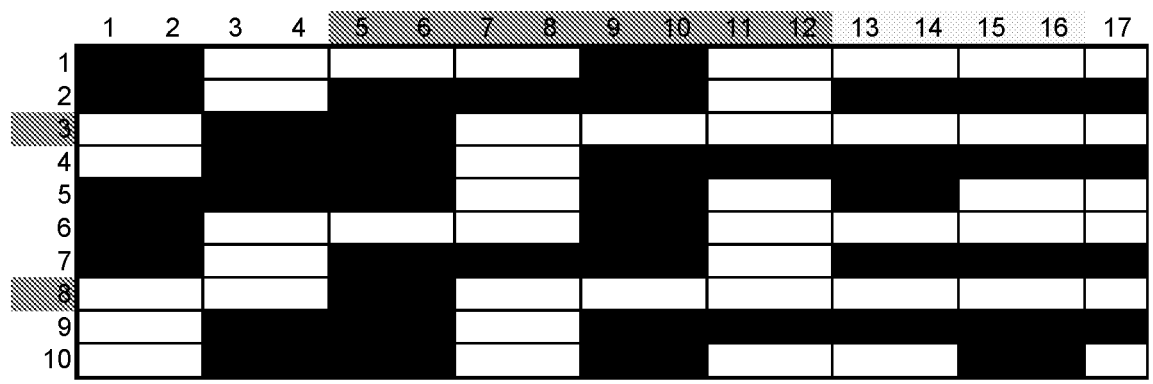
Figure 17:
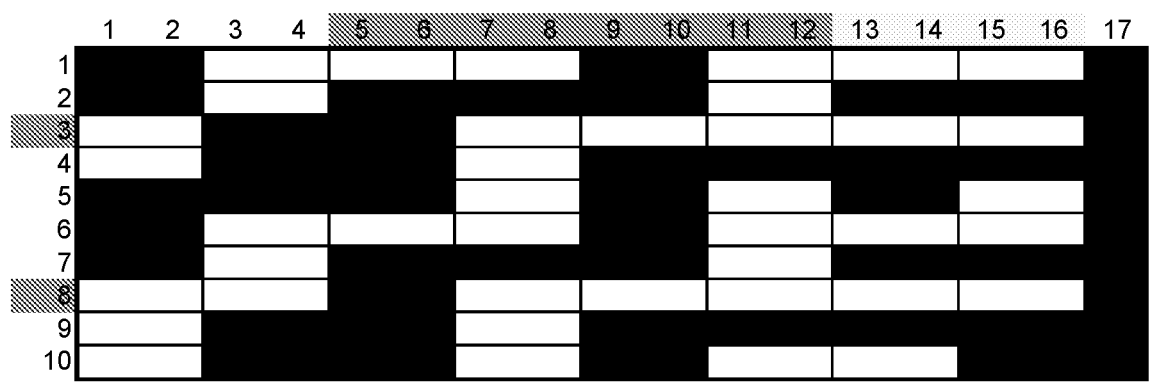

FIGS. 13-17 are pick diagrams for creating a connection segment 12 or 14 of the woven webbing with various weaving patterns. For example, FIGS. 13-15 show a twenty harness loom, with harnesses 1-2 representing binder yarns, harnesses 3-10 representing ground yarns, harnesses 11-14 representing elongation yarns, and harnesses 15-16 representing marker yarns. FIGS. 16-17 show a seventeen harness loom, with harnesses 1-2 representing binder yarns, harnesses 3-10 representing ground yarns, harnesses 11-14 representing elongation yarns, and harnesses 15-16 representing marker yarns.

Figure 18A:
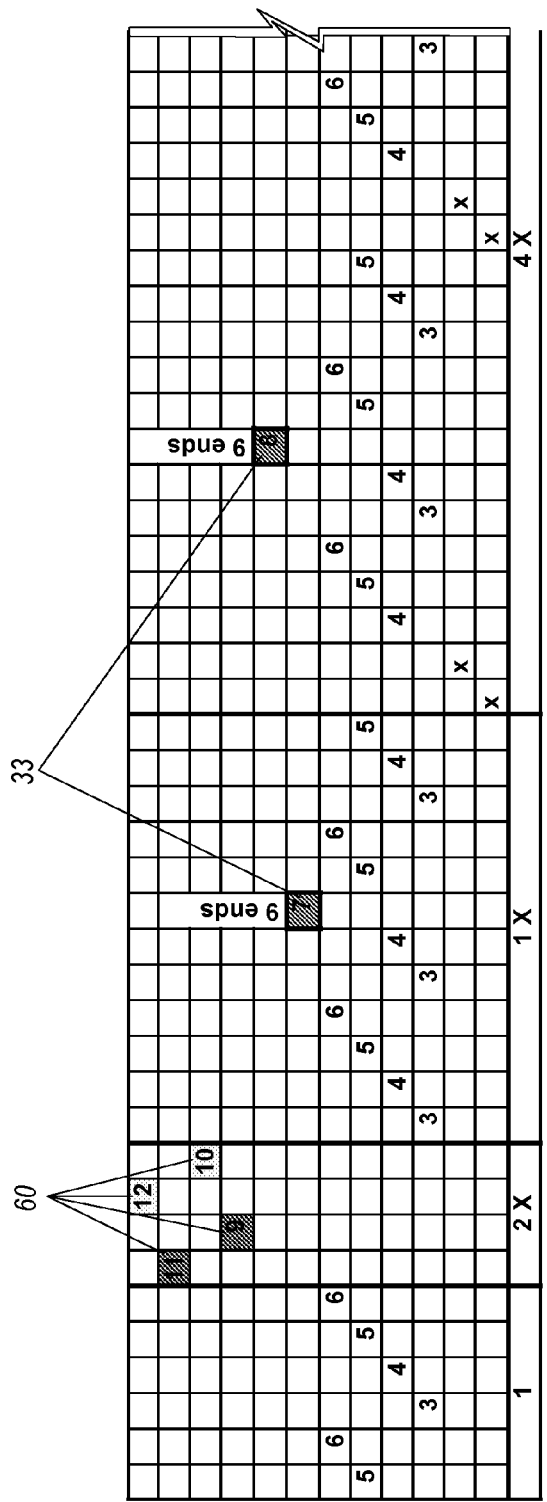
FIGS. 18A and 18B, is a drawing diagram of the fabric structure according to one embodiment of the invention.
Figure 18B:
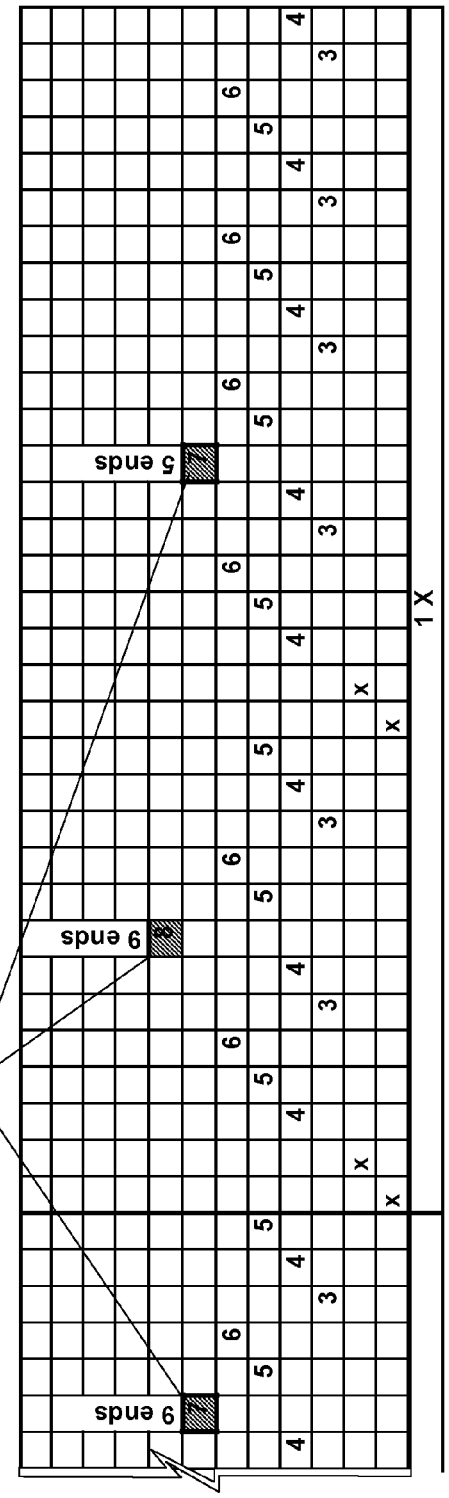

The drawing diagram of FIG. 18 shows the placement of yarns in harnesses to produce the fabric structure of FIGS. 1 and 2. The pick diagrams of FIGS. 4-8 and 13-17 represent action of the harnesses to create the woven fabric structure. The vertical axis of FIG. 18 represents the number of harnesses of a loom used to make the fabric structure of this embodiment. In this embodiment, twelve harnesses are used. The horizontal axis of FIG. 18 represents the yarns that are used to create the fabric structure, with the bottom line showing the number of times each section repeats. For example, the first column of FIG. 18 illustrates that the first yarn is in the fifth harness frame, while the second yarn is in the sixth harness frame.

In a preferred embodiment, the fabric structure 10 is a 4 foot by 1 and ⅜ foot nylon structure formed from approximately 248 nylon ground yarns (the ground yarns having a linear density of approximately 1680 denier), 20 nylon binder yarns (the binder yarns having a linear density of approximately 1680 denier), and 90 elongation yarns (the elongation yarns being partially oriented yarns with a linear density of approximately 5580 denier). As shown in FIG. 18, the shaded boxes correspond to either marker yarns 60 or elongation yarns 33. In a preferred embodiment, the fabric structure 10 made according to the drawing diagram of FIG. 18 may be formed on a Mueller NFREQ needle loom. The expansion segment 14 of the fabric structure 10 may be heat treated in an oven at a temperature of 249° F. for approximately 4.5 minutes.

When the expansion segment 14 of a fabric structure 10 such as the one described above is subjected to heat treatment, the elongation yarn bundles 34 shrink in length and the first connection segment 12 and second connection segment 16 move closer together because, in the connection segments, the elongation yarn bundles 34 are secured to the sheath 30. As a result, the expansion segment 14 reduces in length between the first connection segment 12 and the second connection segment 16; however, because the ground yarns 31 and 32 of the sheath 30 do not shrink, the sheath gathers together to form the accordion-like configuration in the expansion segment 14. It is desirable that, in the expansion segment 14, the sheath 30 shrink substantially less than the elongation yarn bundles 34 to maintain a desired length differential between the elongation yarn bundles 34 and the sheath 30.

Figure 20:
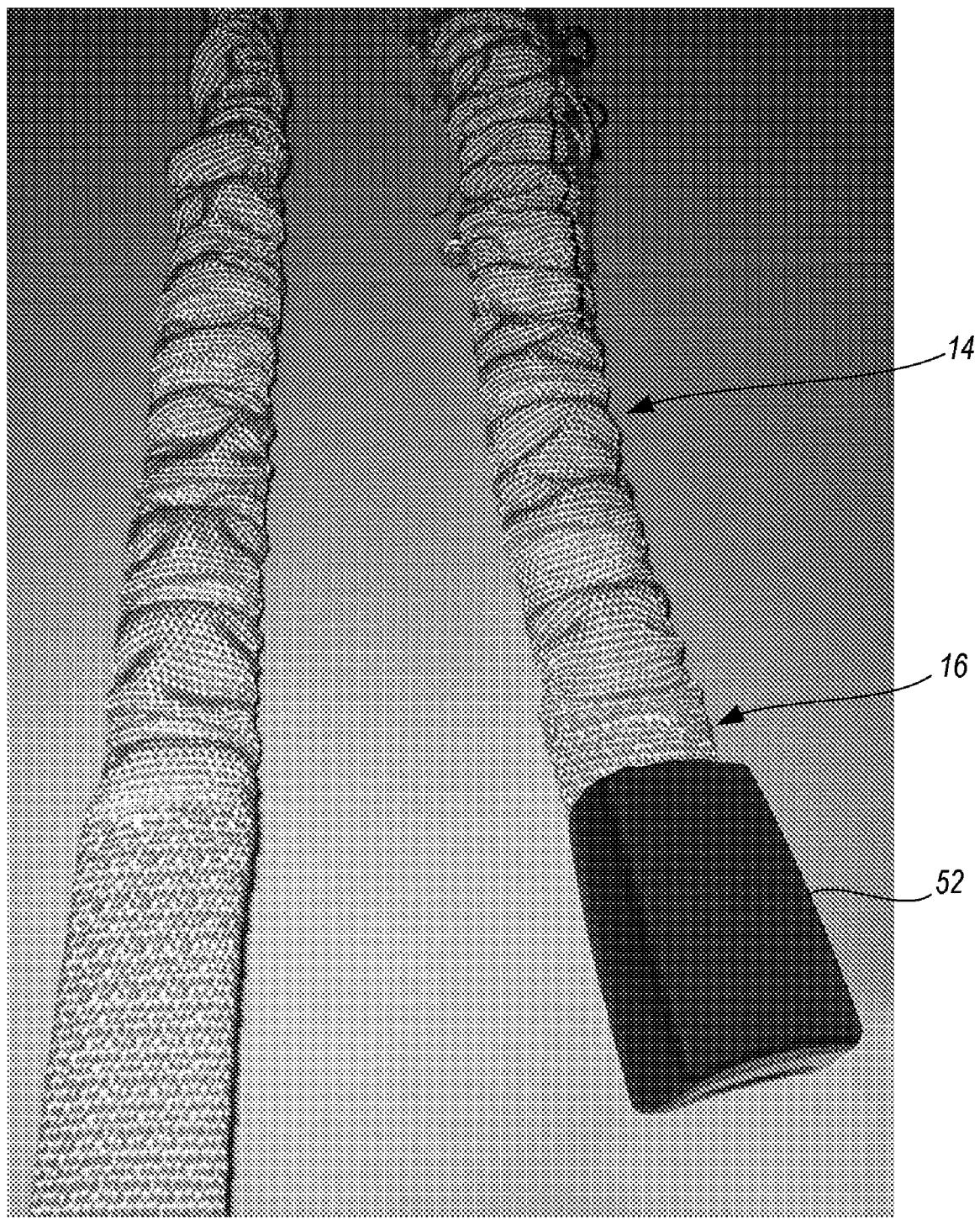
FIG. 20 is a photograph showing a perspective view of the fabric structure of FIG. 1 in use with a seatbelt component.
Figure 26:
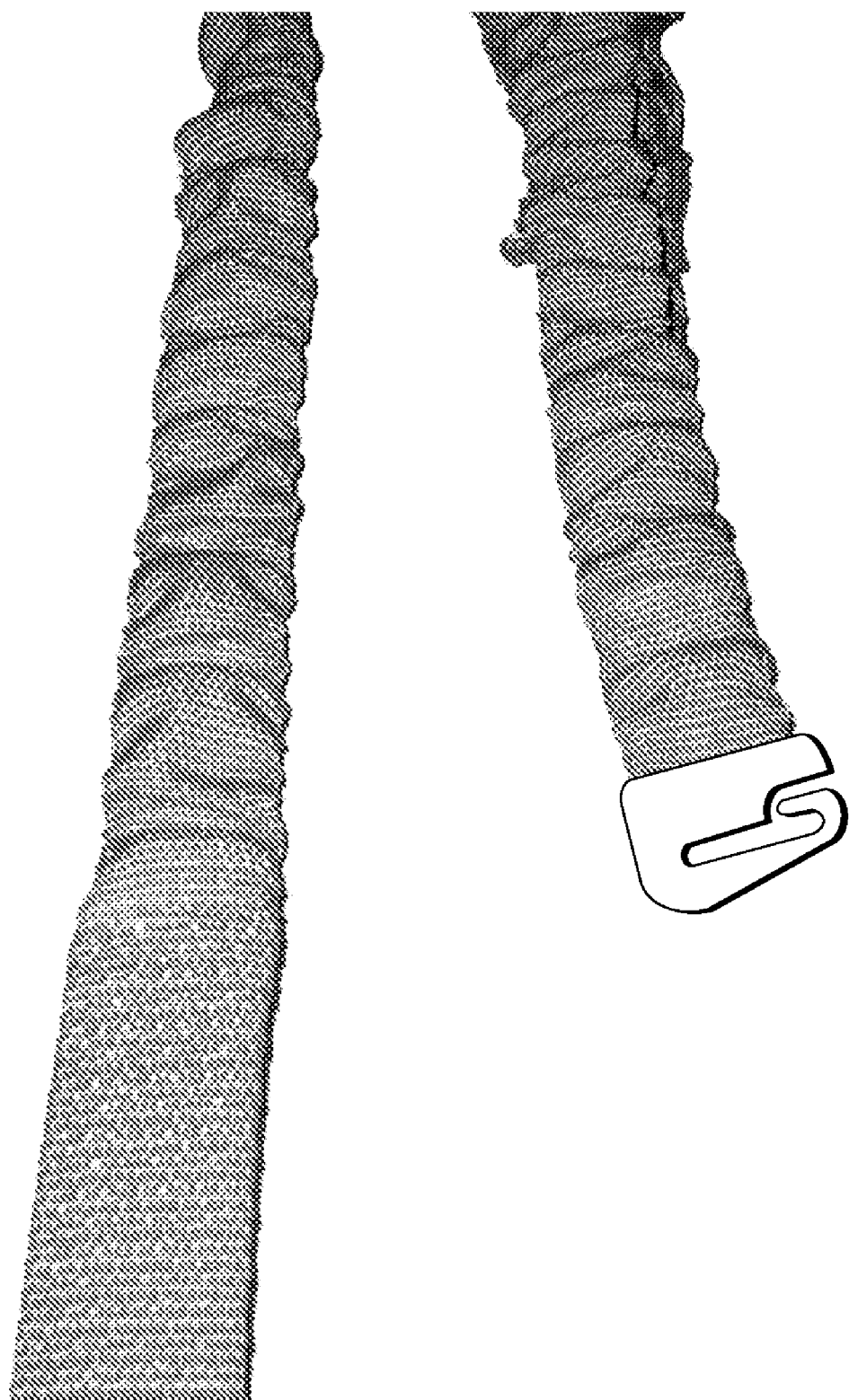
FIG. 26 is a perspective view of the fabric structure of FIG. 1 in use with a clip.

At least one of the connection segments 12 or 16 can be attached to a hardware component, such as a clip, a metal clasp, a harness, or a seatbelt component. For example, one of the connection segments can be attached to a harness worn by a user and the other connection segment can be attached to a load-supporting structure. In some embodiments, one of the connection segments can be attached to a harness and/or a clip for attachment to a child seat for use, for example, in an automobile or other vehicle. As another example, as shown in FIG. 20, connection segment 12 or 16 can be attached to a seatbelt component 52. As shown in FIG. 26, connection segment 12 or 16 could alternatively be attached to a clip.

The fabric structure 10 can be used as a fall protection device, to secure the occupant of a vehicle against harmful movement that may result from a sudden stop, or in any other application where rapid human or other body deceleration may occur. When using the fabric structure as a fall protection device, one end of the fabric structure 10 is securely attached to a safety harness worn by a user. The opposite end of the fabric structure 10 is securely attached to a fixed structure. If the user falls, the fabric structure 10 stops the person's fall and reduces the shock felt by the person as the user is brought to a stop. As the person falls, the fabric structure 10 straightens and the load of the user begins to be applied to the fabric structure 10. The elongation yarns 33 stretch and absorb the force of the load applied to the fabric structure 10. As the elongation yarns 33 stretch, the sheath 30 elongates as the accordion shape unfolds. When the sheath 30 reaches its maximum length, i.e., the accordion shape is completely unfolded, the fabric structure 10 stops the person from falling any farther. The sheath 30 carries the load applied to the expanded fabric structure 10. The shock of stopping the fall that would otherwise be felt by the falling person is reduced or cushioned by the energy-absorbing elongation yarns 33.

Figure 7:
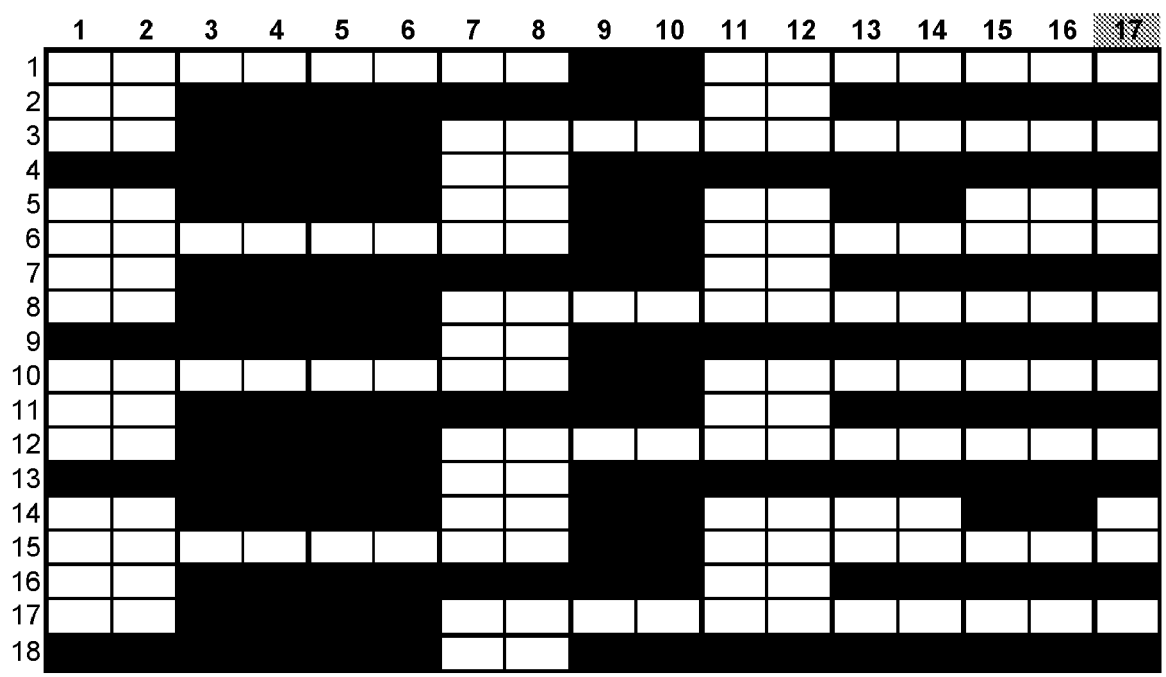
Figure 8:
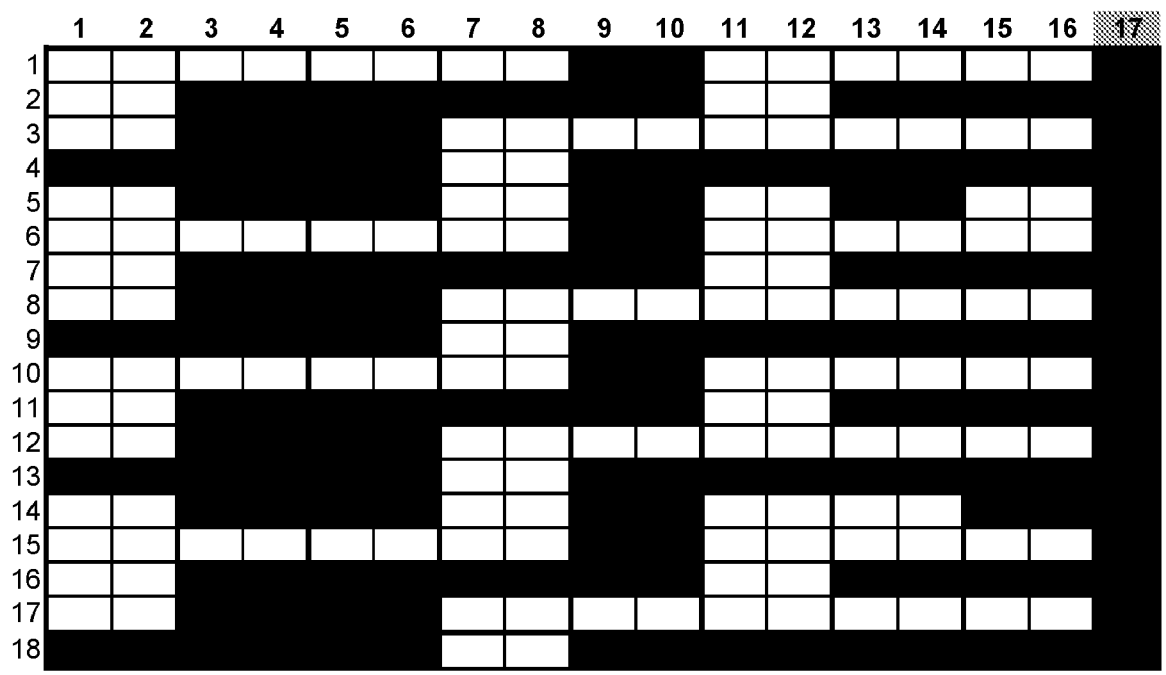
Figure 21:
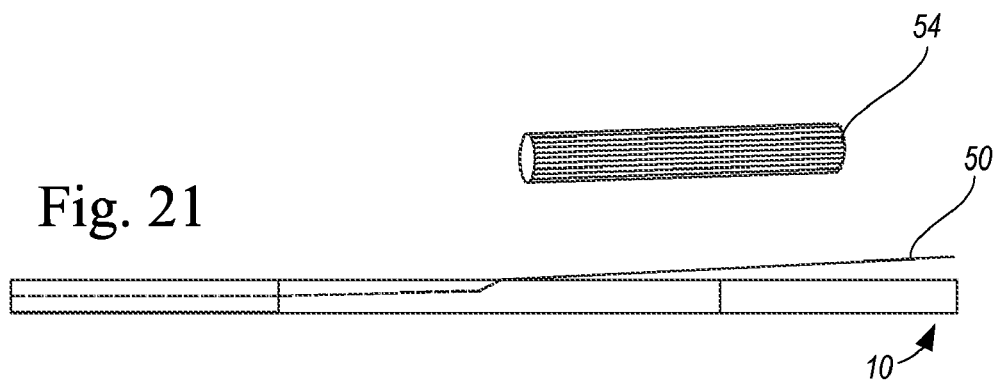
FIGS. 21-25 are illustrations of a fabric structure according to one embodiment of the invention in use with a flag.
Figure 22:
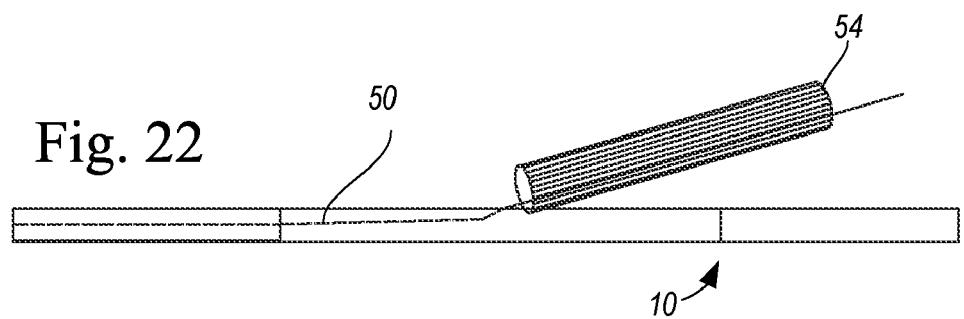
Figure 23:
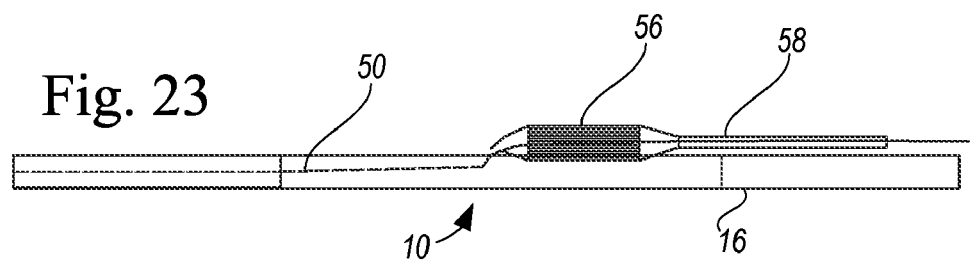
Figure 24:
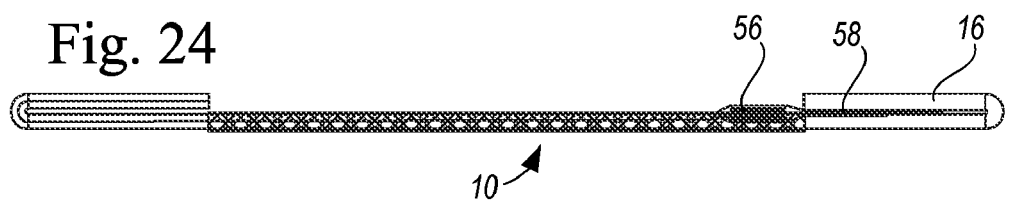
Figure 25:
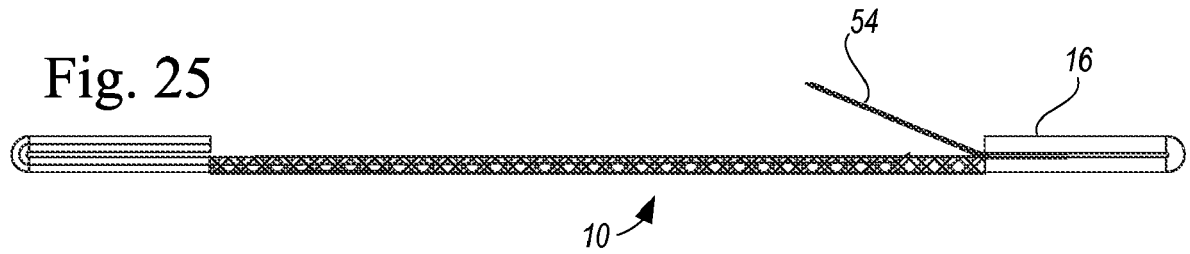

In some embodiments, the fabric structure 10 includes one or more capture yarns 50, as shown in FIGS. 21-25. As shown in FIG. 21, the capture yarn 50, which can be a monofilament yarn, can be woven with the ground yarns inside the sheath 30 as a stuffer through the woven webbing, with at least a portion of the capture yarn exiting the woven webbing. FIG. 7 shows a pick diagram for an expansion segment 14 that includes a capture yarn 50, while FIG. 16 shows a pick diagram for a connection segment 12 or 16 that includes a capture yarn 50. In some embodiments, the capture yarn 50 is secured to the sheath in the at least one connection segment and the expansion segment 14. In some embodiments, the capture yarn 50 is secured to the at least one connection segment by interweaving it with the sheath, while in other embodiments the capture yarn 50 may be secured by gluing, stitching, or other suitable manner. The portion of the capture yarn 50 that exits the woven webbing can be inserted inside of a flag 54, as shown in FIG. 22. A portion of the flag 54 can be compressed together around the capture yarn 50 to form a compressed portion 56 of the flag, with the non-compressed portion of the flag 54 forming a tab portion 58, as shown in FIG. 23. A portion of the connection segment where the capture yarn 50 exits the woven webbing, such as second connection segment 16, can be secured to the tab portion 58, as shown in FIG. 24. When a load is applied to the fabric structure to cause the expansion segment 16 to expand, the capture yarn 50 breaks and withdraws as the flag 54 decompresses and is released from the connection segment and expands to its original, non-compressed configuration, as shown in FIG. 25. The releasing of the flag 54 indicates that the elongation yarns 33 have elongated under a load and that the fabric structure 10 has been deployed.

Alternatively, a marker yarn 60 could be interwoven with the sheath 30 in the expansion segment 14 in such a way that the marker yarn 60 is visible on the outside of the woven webbing 10. In some embodiments, the marker yarn 60 is of a different color than the ground yarns 31 and 31 that form the sheath 30. When the elongation yarns 33 elongate after being subjected to a load, the marker yarn 60 stretches along the expansion segment 14 so that the stretched marker yarn 60 indicates that the fabric structure has been deployed.

In one embodiment, a fabric structure 10 is designed to stop a falling person within 3.5 feet, which is in compliance with 29 C.F.R. 1926.104(d) (2008). In this embodiment, the fabric structure 10 has a finished, ready-for-use length of about 6 feet. In other embodiments, the fabric structure has a finished, ready-to-use length of about 4 feet. The fabric structure 10 is formed from a woven webbing having a length of about 9.5 feet. After heat treatment, the elongation yarns 33 have a reduced length of about 6 feet and the sheath 30 retains its 9.5 feet length. However, the sheath 30 is longitudinally gathered together to form the accordion-like shape over the 6 feet finished length. During use of the fabric structure 10, the elongation yarns 33 will stretch from about 6 feet to about 9.5 feet, unfolding the accordion-shaped sheath 30 to the maximum length of about 9.5 feet. When the fabric structure 10 reaches the maximum 9.5 feet length, the fabric structure 10 stops the person's fall. The elongation yarns 33 absorb the energy of the fall and reduce the abrupt shock to the person when the fabric structure 10 stops the fall.

In another embodiment of the present invention, a fabric structure has lengths of the elongation yarns and the sheath to stop a falling person within about 11.75 feet. The fabric structures, however, can be made in any desired length according to the present invention.

The fabric structures of the present invention can be made of any suitable materials including, but not limited to, synthetic material yarns woven to form the fabric structure.

Various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The invention claimed is:

1. A fabric structure comprising:
   (a) a woven webbing comprising: (1) a plurality of ground yarns; (2) a plurality of elongation yarns; (3) a plurality of binder yarns, the ground yarns, the elongation yarns, and the binder yarns extending in a substantially warp direction; and (4) a plurality of lateral yarns, the lateral yarns extending in a substantially weft direction; wherein the elongation yarns comprise partially oriented yarns; and wherein the webbing comprises:
      (i) a first connection segment wherein the binder yarns are interwoven with the ground yarns and the elongation yarns;
      (ii) an expansion segment having first and second ends wherein the first end of the expansion segment is adjacent to the first connection segment, wherein the ground yarns comprise a sheath that surrounds the elongation yarns, wherein at least some of the lateral yarns are interwoven with the elongation yarns and the ground yarns of the sheath to connect the elongation yarns with the sheath, wherein the length of the elongation yarns is shorter than the length of the sheath, and wherein the binder yarns are woven with the ground yarns of the sheath and are not woven with the elongation yarns; and
      (iii) a second connection segment having first and second ends, wherein the first end of the second connection segment is adjacent to the second end of the expansion segment, and wherein the binder yarns are interwoven with the ground yarns and the elongation yarns,
   wherein the expansion segment further comprises:
      at least one non-attachment point wherein the lateral yarns are woven with the ground yarns and are not woven with the elongation yarns; and
      a plurality of attachment points wherein the lateral yarns are woven in between the elongation yarns between outer edges of the sheath and are only woven with the sheath ground yarns at the outer edges of the sheath.

2. The fabric structure of claim 1, wherein in at least one of the connection segments the elongation yarns are interwoven with the ground yarns.

3. The fabric structure of claim 1, wherein an end of at least one of the connection segments is attached to a hardware component.

4. The fabric structure of claim 3, wherein the hardware component is a clip.

5. The fabric structure of claim 3, wherein the hardware component is a component of a seatbelt.

6. The fabric structure of claim 1, wherein the difference in length between the elongation yarns and the sheath in the expansion section is sufficient to allow the elongation yarns to stretch upon application of a predetermined load that is less than a breaking strength of the sheath.

7. The fabric structure of claim 1, wherein the sheath comprises a top sheath layer and a bottom sheath layer, and wherein the elongation yarns are positioned between the top sheath layer and the bottom sheath layer.

8. The fabric structure of claim 7, wherein the top sheath layer comprises upper ground yarns and the bottom sheath layer comprises lower ground yarns and wherein in the first connection segment the upper ground yarns are interwoven with the lower ground yarns.

9. The fabric structure of claim 8, wherein in the second connection segment the upper ground yarns are interwoven with the lower ground yarns.

10. The fabric structure of claim 1, wherein the ground yarns collectively have a tensile strength of at least 5,000 lbs.

11. The fabric structure of claim 1, further comprising a flag and a capture yarn, wherein a portion of the capture yarn is woven within at least a portion of the sheath in at least the expansion segment and is received in the flag, wherein when the expansion segment expands, a portion of the flag is released to indicate such expansion.

12. The fabric structure of claim 1, further comprising a marker yarn, wherein the marker yarn is woven as part of the sheath in the expansion segment and is of a different color than the ground yarns.

13. A fabric structure comprising:
a woven webbing comprising: (1) a plurality of ground yarns and a plurality of elongation yarns, the ground yarns and the elongation yarns extending in a substantially warp direction; and (2) a plurality of lateral yarns, the lateral yarns extending in a substantially weft direction; wherein the elongation yarns comprise partially oriented yarns; and wherein the webbing comprises:
  (i) a first connection segment wherein the ground yarns and the elongation yarns are interwoven together;
  (ii) an expansion segment having first and second ends wherein the first end of the expansion segment is adjacent to the first connection segment, wherein the ground yarns comprise a sheath that surrounds the elongation yarns, wherein at least some of the lateral yarns are interwoven with the elongation yarns and the ground yarns of the sheath to connect the elongation yarns with the sheath, and wherein the length of the elongation yarns is shorter than the length of the sheath; and
  (iii) a second connection segment having first and second ends, wherein the first end of the second connection segment is adjacent to the second end of the expansion segment, and wherein the ground yarns and the elongation yarns are interwoven together,
wherein the expansion segment further comprises:
  at least one non-attachment point wherein the lateral yarns are woven with the ground yarns and are not woven with the elongation yarns; and
  a plurality of attachment points wherein the lateral yarns are woven in between the elongation yarns between outer edges of the sheath and are only woven with the sheath ground yarns at the outer edges of the sheath.

14. The fabric structure of claim 13, wherein the difference in length between the elongation yarns and the sheath in the expansion section is sufficient to allow the elongation yarns to stretch upon application of a predetermined load that is less than a breaking strength of the sheath.

15. The fabric structure of claim 13, wherein the sheath comprises a top sheath layer and a bottom sheath layer, and wherein the elongation yarns are positioned between the top sheath layer and the bottom sheath layer.

16. The fabric structure of claim 15, wherein the top sheath layer comprises upper ground yarns and the bottom sheath layer comprises lower ground yarns and wherein in the first connection segment the upper ground yarns are interwoven with the lower ground yarns.

17. The fabric structure of claim 13, further comprising a flag and a capture yarn, wherein a portion of the capture yarn is woven within at least a portion of the sheath in at least the expansion segment and is received in the flag, wherein when the expansion segment expands, a portion of the flag is released to indicate such expansion.

18. The fabric structure of claim 13, further comprising a marker yarn, wherein the marker yarn is woven as part of the sheath in the expansion segment and is of a different color than the ground yarns.

19. The fabric structure of claim 13, wherein, at the attachment points, the lateral yarns are interwoven between substantially all of the plurality of elongation yarns.

20. The fabric structure of claim 13, wherein, at the attachment points, the lateral yarns are not interwoven with the ground yarns in between the outer edges of the sheath.

21. A fabric structure comprising:
a woven webbing comprising: (1) a plurality of ground yarns and a plurality of elongation yarns, the ground yarns and the elongation yarns extending in a substantially warp direction; and (2) a plurality of lateral yarns, the lateral yarns extending in a substantially weft direction; wherein the elongation yarns comprise partially oriented yarns; and wherein the webbing comprises:
  (i) a first connection segment wherein the ground yarns and the elongation yarns are interwoven together;
  (ii) an expansion segment having first and second ends wherein the first end of the expansion segment is adjacent to the first connection segment, wherein the ground yarns comprise a sheath that surrounds the elongation yarns, wherein at least some of the lateral yarns are interwoven with the elongation yarns and the ground yarns of the sheath to connect the elongation yarns with the sheath, and wherein the length of the elongation yarns is shorter than the length of the sheath; and
  (iii) a second connection segment having first and second ends, wherein the first end of the second connection segment is adjacent to the second end of the expansion segment, and wherein the ground yarns and the elongation yarns are interwoven together,
wherein, periodically along a length of the expansion segment, the plurality of lateral yarns are only interwoven with the elongation yarns between outer edges of the sheath and are only interwoven with the ground yarns at the outer edges of the sheath to connect the elongation yarns with the sheath.

22. A fabric structure comprising:
a woven webbing comprising: (1) a plurality of ground yarns and a plurality of elongation yarns comprising partially oriented yarns, wherein the ground yarns and the elongation yarns extend in a substantially warp direction throughout the webbing; and (2) a plurality of lateral yarns, wherein the lateral yarns extend in a substantially weft direction; and wherein the webbing comprises:

(i) a first connection segment wherein the ground yarns and the elongation yarns are interwoven together;

(ii) an expansion segment having first and second ends wherein the first end of the expansion segment is adjacent to the first connection segment, wherein the ground yarns comprise a sheath that surrounds the elongation yarns; and (iii) a second connection segment having first and second ends, wherein the first end of the second connection segment is adjacent to the second end of the expansion segment, and wherein the ground yarns and the elongation yarns are interwoven together, wherein the sheath surrounds the elongation yarns throughout the fabric structure and is gathered throughout the expansion segment and is substantially flat throughout the first and second connection segments, and wherein the fabric structure comprises a plurality of attachment points that occur periodically along a length of the expansion segment, and wherein, at the attachment points, lateral yarns extend in the weft direction and (1) are only interwoven with the elongation yarns between a first outer edge of the sheath and a second outer edge of the sheath and (2) are only interwoven with the ground yarns at the first and second outer edges of the sheath.

23. The fabric structure of claim 22, wherein a length of the elongation yarns is shorter than a length of the ground yarns and the difference in length between the elongation yarns and the ground yarns is sufficient to allow the elongation yarns to stretch throughout the expansion segment upon application of a predetermined load that is less than a breaking strength of the ground yarns.

24. The fabric structure of claim 22, wherein the expansion segment further comprises at least one non-attachment point wherein the lateral yarns are woven with the ground yarns and are not woven with the elongation yarns.

25. The fabric structure of claim 22, wherein, at the attachment points, the lateral yarns are interwoven between substantially all of the plurality of elongation yarns.

* * * * *

UNITED STATES PATENT AND TRADEMARK OFFICE
CERTIFICATE OF CORRECTION

PATENT NO. : 8,387,749 B2
APPLICATION NO. : 12/183491
DATED : March 5, 2013
INVENTOR(S) : Timothy M. Russell et al.

Page 1 of 1

It is certified that error appears in the above-identified patent and that said Letters Patent is hereby corrected as shown below:

In the Claims:

In column 11, line 26, in Claim 11, delete "yam," and insert -- yarn, --, therefor.

In column 11, line 26, in Claim 11, delete "yam" and insert -- yarn --, therefor.

In column 12, line 22, in Claim 18, delete "yam," and insert -- yarn, --, therefor.

Signed and Sealed this
Twenty-eighth Day of May, 2013

Teresa Stanek Rea
*Acting Director of the United States Patent and Trademark Office*